United States Patent [19]

Nielinger et al.

[11] Patent Number: 4,645,822

[45] Date of Patent: Feb. 24, 1987

[54] POLYAMIDE STABILIZED AGAINST THE EFFECT OF LIGHT WITH MALEIC IMIDE CARBOXYLIC ACID CHLORIDE CHAIN TERMINATOR

[75] Inventors: Werner Nielinger, Krefeld; Wolfgang Stix, Neckarsteinach; Ludwig Bottenbruch, Krefeld, all of Fed. Rep. of Germany

[73] Assignee: Bayer Aktiengesellschaft, Leverkusen, Fed. Rep. of Germany

[21] Appl. No.: 776,671

[22] Filed: Sep. 16, 1985

[30] Foreign Application Priority Data

Sep. 26, 1984 [DE] Fed. Rep. of Germany ....... 3435202

[51] Int. Cl.$^4$ .............................................. C08G 69/28
[52] U.S. Cl. .................................. 528/336; 528/314; 528/322
[58] Field of Search ............... 528/336, 314, 322, 8.86

[56] References Cited

U.S. PATENT DOCUMENTS 4,239,883 12/1980 Stenzenberger .................... 528/322

*Primary Examiner*—Harold D. Anderson
*Attorney, Agent, or Firm*—Connolly and Hutz

[57] ABSTRACT

Thermoplastic polyamides with improved stability against reduction in molecular weight due to the effect of light, which have maleic imides as end groups.

7 Claims, No Drawings

POLYAMIDE STABILIZED AGAINST THE EFFECT OF LIGHT WITH MALEIC IMIDE CARBOXYLIC ACID CHLORIDE CHAIN TERMINATOR

The present invention relates to polyamides, which are stabilised against reduction in molecular weight due to the effect of light.

In DOS No. 2 626 769, polymers with reactive groups are described, which cross-link under the influence of electromagnetic waves. By exposing films produced therefrom to light, relief-type pictures are produced, while after exposure to light, the unexposed and thus non-cross-linked polymer portions are dissolved out.

The polymers have an average molecular weight of at least 1,000. As reactive groups, they contain on average more than two maleic imide groups per molecule, those of the formula

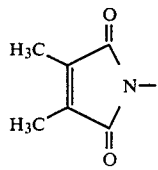

being most particularly preferred.

The cross-linkable polyamides are obtained according to DOS No. 2 626, 769, by polycondensing a diamine with a mixture of one or several dicarboxylic acid chlorides and a particular quantity of 5-dimethyl maleic imidylbenzene-1,3-dicarboxylic acid dichloride, whereby molecules with several lateral maleic imide radicals arise, which cross-link during exposure to light.

However, in order to still obtain non-cross-linking products after exposure to light, it is natural to produce polyamides with on average one maleic imide group per molecule, while the monofunctional carboxylic acid chloride, namely 4-dimethyl maleic imidylbenzene-carboxylic acid chloride is used in the polycondensation. With these polyamides however, an increase in molecular weight after exposure to light does not occur as expected, rather the known reduction under the effect of light is observed.

It has surprisingly now been found that the reduction in molecular weight does not occur when monofunctional dialkyl maleic imide acid chlorides are used in the production of polyamides, which are substituted on the imido nitrogen by an alkyl group.

The object of the invention is thus thermoplastic polyamides with maleic imide end groups of the general formula I

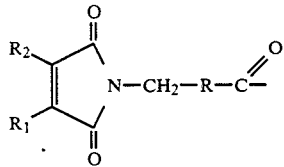

wherein
R represents a bond, an alkyl radical with from 1 to 5 preferably from 1 to 2 carbon atoms, a cycloalkyl radical with $C_5$-$C_{10}$, preferably $C_6$-$C_8$, particularly preferably a cyclohexyl radical, or an aryl radical with $C_6$-$C_{12}$, preferably $C_6$-$C_{10}$, particularly preferably a phenyl radical, and
$R_1$ and $R_2$ are the same or different, and represent an alkyl radical with $C_1$-$C_4$, preferably $C_1$-$C_2$, preferably a methyl radical.

Polyamides and copolyamides of aliphatic, araliphatic and aromatic diamines and dicarboxylic acids are used as the polyamides. Examples of suitable diamines are; tetra-, hexa-, hepta-, octa- and decamethylene diamine, dimethyl- and trimethylhexamethylene diamine, 1,4-diaminocyclohexane, 1,4-bisaminomethyl-cyclohexane, 3-aminomethyl-3,5,5-trimethyl-cyclohexyl-amine, bis-(4-aminocyclohexyl)-methane, bis-(4-aminocyclohexyl)-propane, bis-(3-methyl-4-aminocyclohexyl)-methane, 1,3 and 1,4-bis(aminomethyl)benzene, 1,3- and 1,4-diaminobenzene, 2,4-diaminotoluene, 4,4'-diaminodiphenyl-methane, 4,4'-diaminodiphenylether and 4,4'-diaminodiphenylsulphone.

Suitable dicarboxylic acids are for example: adipic acid, azelaic acid, sebacic acid, dodecane dicarboxylic acid, cyclohexane dicarboxylic acid, isophthalic acid, terephthalic acid, 4,4'-diphenylcarboxylic acid and 4,4'-diphenylether dicarboxylic acid.

Amorphous polyamides are particularly preferred.

The production of the polyamides takes place according to the known methods in solution or in the interphase, starting from diamines and dicarboxylic acid chlorides. The maleic imide carboxylic acid chlorides of the formula II

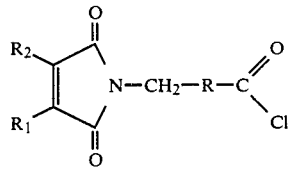

wherein
R, $R_1$ and $R_2$ are as defined above, are used in a quantity of from 0.5 to 10, preferably from 1 to 8 mol %, based on the dicarboxylic acid dichloride.

The polyamides produced according to the invention can be processed, according to known methods, to light-stabilised mouldings, particularly films.

EXAMPLE 1

A solution of 20.30 g (0.1 mol) of isophthalic acid dichloride and 0.40 g (0.002 mol) of a dimethyl maleic imidyl carboxylic acid chloride of the formula

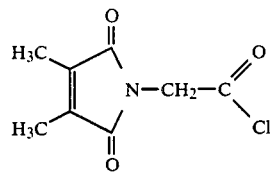

in 375 ml of methylene chloride are added dropwise with intensive stirring at from 20° to 25° C. in the course of 15 min to a solution of 14.53 g (0.125 mol) of hexamethylene diamine and 8.0 g (0.2 mol) of sodium hydroxide in 1500 g of water. The addition of the acid chlorides takes place such that a mixture of 75% of the isophthalic acid chloride and the total quantity of the dimethyl maleic imidyl carboxylic acid chloride, dissolved in 75% of the given quantity of methylene chloride is firstly metered in immediately followed by the remaining isophthalic acid dichloride solution.

The precipitated polyamide is crushed, washed chloride-free with water and dried.

Yield: 24.1 g

The relative viscosity, measured on a 1% solution in m-cresol in an Ubbe-Lohde viscosimeter at 25° C., is 2.2.

EXAMPLE 2

The production of the polyamide takes place as described in Example 1, but with 0.43 g (0.002 mol) of a dimethyl maleic imidyl carboxylic acid chloride of the formula

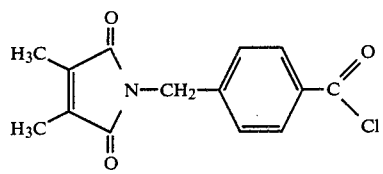

COMPARATIVE EXAMPLE 1

The production of the polyamide takes place as described in Example 1, but with 0.41 g (0.002 mol) of a dimethyl maleic imidyl carboxylic acid chloride of the formula

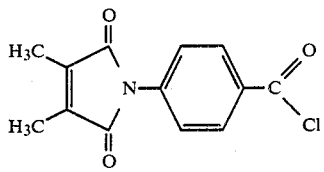

COMPARATIVE EXAMPLE 2

The production of the polyamide takes place as described in Example 1, but with 1.62 g (0.008 mol) of the dimethyl maleic imidyl carboxylic acid chloride according to Comparative Example 1.

COMPARATIVE EXAMPLE 3

A polyamide is produced according to Example 1, but without addition of the dimethyl maleic imidyl carboxylic acid chloride.

Films are cast from a 20% solution of the polyamides in formic acid. After evaporating the solvent, the film thickness is 50 μm. These films are exposed to light for 8 h with a mercury vapour high-pressure lamp of the type Philips HKP 125 W, the films being at a distance of 5 cm from the lamp. The relative viscosities of the films, measured as given above, before and after exposure to light can be seen in the following table.

| polyamide according to | relative viscosity | |
|---|---|---|
| | before exposure | after exposure |
| Example 1 | 2.0 | 2.5 |
| Example 2 | 2.9 | 2.8 |
| Comparative Example 1 | 2.5 | 2.1 |
| Comparative Example 2 | 2.3 | 1.8 |
| Comparative Example 3 | 3.6 | 3.1 |

We claim:
1. Themoplastic polyamide with improved stability against reduction in molecular weight due to the effect of light, having as end groups maleic imides of the formula

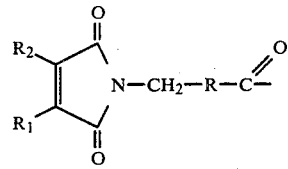

wherein
R represents a bond or R represents an alkyl radical with from 1 to 5 carbon atoms, a $C_5$–$C_{10}$ cycloalkyl radical or a $C_6$–$C_{12}$ aryl radical, and
$R_1$ and $R_2$ are the same or different and represent a $C_1$–$C_4$ alkyl.

2. Polyamide as claimed in claim 1, wherein R represents a cyclohexyl- or phenyl radical and $R_1$ and $R_2$ each represent a methyl radical.

3. Polyamide as claimed in claim 1 produced in the presence of at least one maleic imide carboxylic acid chloride of the formula

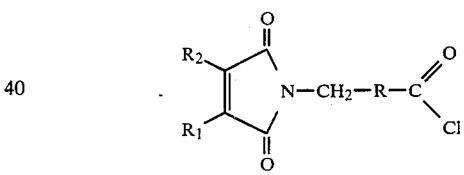

wherein
R, $R_1$ and $R_2$ are as previously defined.

4. Polyamide as claimed in claim 3, wherein the maleic imide carboxylic acid chloride is are used in amounts of from 0.5 to 10 mol-%.

5. Polyamide as claimed in claim 3, wherein 1-8 mol-% of acid chloride is used.

6. Polyamide as claimed in claim 1 wherein
R represents a bond, or R represents an alkyl radical with 1 to 2 carbon atoms, a $C_6$–$C_8$ cycloalkyl radical, or $C_6$–$C_{10}$ alkyl,
$R_1$ and $R_2$ are the same or different, and represent an alkyl radical with 1 or 2 carbon atoms.

7. Light-stabilised moulding or fiber produced from polyamide as claimed in claim 1.

* * * * *